(12) United States Patent
Dandekar et al.

(10) Patent No.: US 9,904,707 B1
(45) Date of Patent: Feb. 27, 2018

(54) SYSTEMS AND METHODS FOR OPTIMIZED DATABASE SAMPLING

(71) Applicant: Dell Software Inc., Aliso Viejo, CA (US)

(72) Inventors: Shree A. Dandekar, Cedar Park, TX (US); Mark William Davis, Tracy, CA (US)

(73) Assignee: Quest Software Inc., Aliso Viejo, CA (US)

( * ) Notice: Subject to any disclaimer, the term of this patent is extended or adjusted under 35 U.S.C. 154(b) by 351 days.

(21) Appl. No.: 14/672,791

(22) Filed: Mar. 30, 2015

(51) Int. Cl.
*G06F 17/30* (2006.01)

(52) U.S. Cl.
CPC .. *G06F 17/30457* (2013.01); *G06F 17/30474* (2013.01)

(58) Field of Classification Search
CPC ......... G06F 17/30457; G06F 17/30463; G06F 17/30466; G06F 17/30469; G06F 17/30474; G06F 17/30477; G06F 17/3048; G06F 17/30483; G06F 17/30492; G06F 17/3051
USPC ....... 707/707, 713, 714, 717, 718, 720, 737, 707/739, 749, 770, 999.006
See application file for complete search history.

(56) References Cited

U.S. PATENT DOCUMENTS

| 6,154,749 | A | 11/2000 | Aravamudan et al. | |
|---|---|---|---|---|
| 6,263,345 | B1 * | 7/2001 | Farrar | G06F 17/30454 700/110 |
| 7,162,467 | B2 | 1/2007 | Eshleman et al. | |
| 7,953,728 | B2 * | 5/2011 | Hu | G06F 17/30536 707/719 |
| 8,527,543 | B1 * | 9/2013 | Weil | G06F 17/30306 707/791 |
| 2003/0055813 | A1 * | 3/2003 | Chaudhuri | G06F 17/30469 |
| 2003/0088541 | A1 * | 5/2003 | Zilio | G06F 17/30312 |
| 2010/0306256 | A1 | 12/2010 | Blackman | |
| 2015/0149441 | A1 * | 5/2015 | Nica | G06F 17/30463 707/719 |

OTHER PUBLICATIONS

Afzal, Wasif, et al.; "Resampling Methods in Software Quality Classification"; International Journal of Software Engineering and Knowledge Engineering, vol. 22, No. 2; 2012; pp. 203-223.

(Continued)

*Primary Examiner* — Greta Robinson
(74) *Attorney, Agent, or Firm* — Winstead PC

(57) ABSTRACT

In one embodiment, a method includes receiving a request to execute a database statement in satisfaction of a time constraint. The method further includes determining a pattern of the database statement. Additionally, the method includes comparing the pattern to pattern metadata associated with cached samples of the distributed database. Also, the method includes, responsive to a determination that the comparing has resulted in one or more matches, selecting a target sample and causing the database statement to be executed on the target sample. The method further includes, responsive to a determination that the target sample resolves the database statement in satisfaction of the time constraint, returning a resulting dataset to a requestor. Moreover, the method includes, responsive to a determination that the target sample does not resolve the database statement in satisfaction of the time constraint, causing a new real-time sampling of the distributed database to be executed.

20 Claims, 7 Drawing Sheets

(56) References Cited

OTHER PUBLICATIONS

Preacher, Kristopher J., et al; "Asymptotic and Resampling Strategies for Assessing and Comparing Indirect Effects in Multiple Mediator Models"; Behavior Research Methods, vol. 40, No. 3; 2008; pp. 879-891.

Blum, Ben, et al.; "Feature Selection Methods for Improving Protein Structure Prediction with Rosetta"; Advances in Neural Information Processing Systems 20, 21st Annual Conference on Neural Information Processing Systems 2007; Dec. 3-6, 2007; 8 pages.

\* cited by examiner

SYSTEMS AND METHODS FOR OPTIMIZED DATABASE SAMPLING

BACKGROUND

Technical Field

The present disclosure relates generally to databases and more particularly, but not by way of limitation, to systems and methods for optimized database sampling.

History of Related Art

A database generally includes a collection of information or data organized in a way that computer programs can quickly access or select desired portions of the collection. A common type of database is the relational database, which stores data in logical structures called tables. Databases, including relational databases, can be accessed and modified using a database management system (DBMS). Several relational DBMS products are available from companies such as Oracle Corporation®, IBM®, and Microsoft® as well as from various open-source vendors. Particularly when dealing with large, distributed databases, retrieving complex sums, aggregates, joins, or other types of statistical information can be very slow.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed by a computer system. The method includes receiving a request to execute a database statement in satisfaction of a time constraint, wherein the database statement specifies a distributed database as a data source. The method further includes determining a pattern of the database statement based, at least in part, on an analysis of database statement syntax. In addition, the method includes comparing the pattern to pattern metadata associated with cached samples of the distributed database. For each of the cached samples, the pattern metadata characterizes an assortment of data values contained therein. Also, the method includes, responsive to a determination that the comparing has resulted in one or more matches between the pattern and the pattern metadata, selecting a target sample from among the cached samples. In addition, the method includes causing the database statement to be executed on the target sample. The method further includes, responsive to a determination that the target sample resolves the database statement in satisfaction of the time constraint, returning a resulting dataset to a requestor. Moreover, the method includes, responsive to a determination that the target sample does not resolve the database statement in satisfaction of the time constraint, causing a new real-time sampling of the distributed database to be executed.

In one embodiment, an information handling system includes at least one processor. The at least one processor is operable to implement a method. The method includes receiving a request to execute a database statement in satisfaction of a time constraint, wherein the database statement specifies a distributed database as a data source. The method further includes determining a pattern of the database statement based, at least in part, on an analysis of database statement syntax. In addition, the method includes comparing the pattern to pattern metadata associated with cached samples of the distributed database. For each of the cached samples, the pattern metadata characterizes an assortment of data values contained therein. Also, the method includes, responsive to a determination that the comparing has resulted in one or more matches between the pattern and the pattern metadata, selecting a target sample from among the cached samples. In addition, the method includes causing the database statement to be executed on the target sample. The method further includes, responsive to a determination that the target sample resolves the database statement in satisfaction of the time constraint, returning a resulting dataset to a requestor. Moreover, the method includes, responsive to a determination that the target sample does not resolve the database statement in satisfaction of the time constraint, causing a new real-time sampling of the distributed database to be executed.

In one embodiment, a computer-program product includes a non-transitory computer-usable medium having computer-readable program code embodied therein. The computer-readable program code is adapted to be executed to implement a method. The method includes receiving a request to execute a database statement in satisfaction of a time constraint, wherein the database statement specifies a distributed database as a data source. The method further includes determining a pattern of the database statement based, at least in part, on an analysis of database statement syntax. In addition, the method includes comparing the pattern to pattern metadata associated with cached samples of the distributed database. For each of the cached samples, the pattern metadata characterizes an assortment of data values contained therein. Also, the method includes, responsive to a determination that the comparing has resulted in one or more matches between the pattern and the pattern metadata, selecting a target sample from among the cached samples. In addition, the method includes causing the database statement to be executed on the target sample. The method further includes, responsive to a determination that the target sample resolves the database statement in satisfaction of the time constraint, returning a resulting dataset to a requestor. Moreover, the method includes, responsive to a determination that the target sample does not resolve the database statement in satisfaction of the time constraint, causing a new real-time sampling of the distributed database to be executed.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1A:
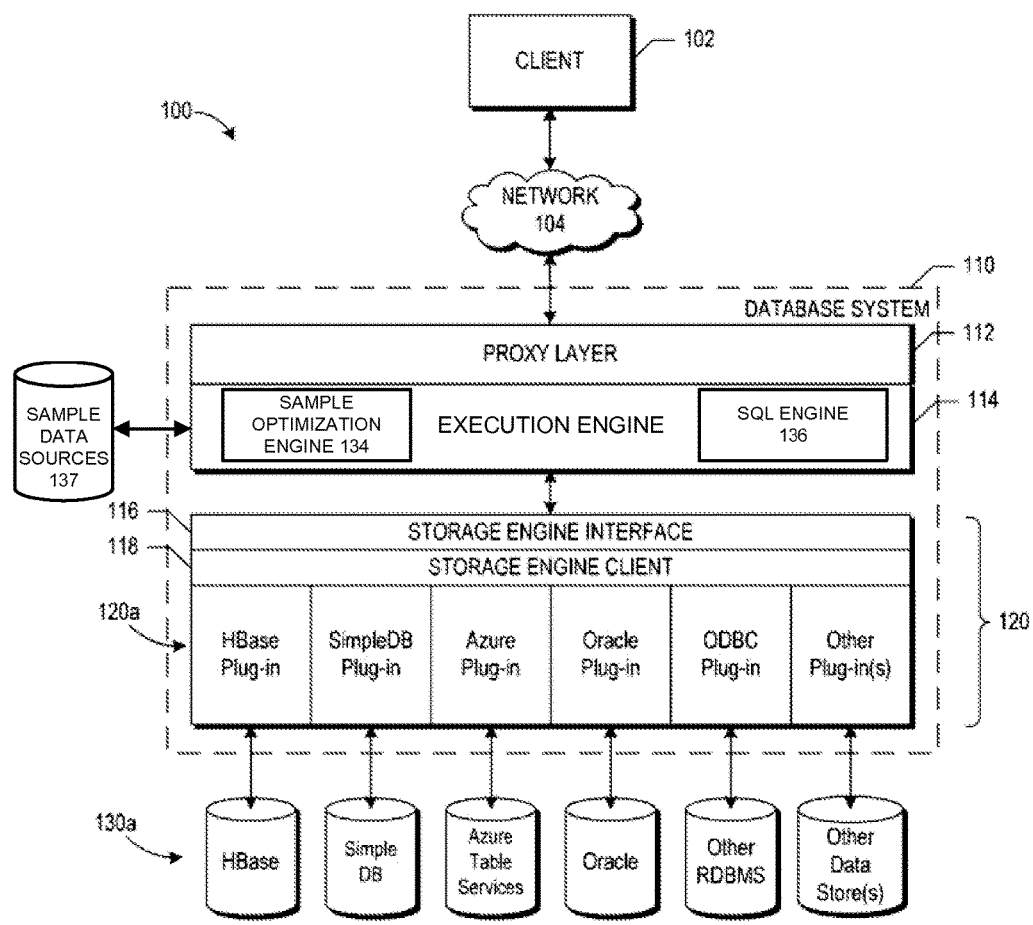
FIG. 1A illustrates an embodiment of a computing environment.

In certain embodiments, users can access databases of a database management system (DBMS) using database statements such as Structured Query Language (SQL) statements. For extremely large databases of stored information, retrieving complex sums, aggregates, joins, or other types of statistical information can be very slow. As an alternative to complete examination of all relevant records in order to resolve such database statements, one way to approach this problem is for databases to sample the data and return both an estimate of a value of interest as well as a measure of an expected reliability of the results based on the sample.

Another approach for addressing the above problem is to aggregate key metrics when data is initially ingested. For instance, the mean of a numerical value in the database can be computed when the data is loaded, rather than computed when a database statement is executed, thus allowing for rapid responses when queried for the mean of that value. However, according to this approach, any speedups would be dependent on the match between the aggregated metrics and the requested queries and there would be no value when the two do not match.

Both of the approaches described above would likely become increasingly complicated when the data and query processing is distributed over many compute nodes (i.e., a distributed database). For instance, if additional data is loaded into one node, the distribution of values may be skewed with regard to the entire collection, invalidating the estimates based on sampling or based on pre-computing measures of special interest. Moreover, these approaches break down when the data is arriving very rapidly and there are updates to many or all nodes, thus invalidating any estimates and reducing the query again to operating over the entire set of values. This may also result in locking the database or parts of it against updates in order to ensure consistent reads of the changing collection.

The present disclosure describes examples of maintaining centralized, cached samples together with sample metadata in sparse representations for different columns of values in a distributed database. Advantageously, in certain embodiments, these cached samples can be efficiently updated as data is added or removed from the system. Additionally, in some embodiments, the centralized cached samples can be continuously refined via identification of new patterns which predict future database statements and queries.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1A depicts an embodiment of a computing environment 100 for database sample optimization. In the depicted embodiment, a client 102 communicates with a database system 110. The client 102 and database system 110 can be implemented on the same or different computing machines. In one embodiment, the client 102 accesses the database system 110 over a network 104 such as a LAN or a WAN (e.g., the Internet).

The client 102 can be implemented in an information handling system, such as one or more physical computing machines. For example, the client 102 can be a desktop, laptop, tablet, wireless handheld device (such as a smartphone or PDA), wearable or body-borne computer or the like. The client 102 can include software for enabling a user to interact with the database system 110. For instance, the client 102 can generate one or more user interfaces that enable the user to query the database system 110 with SQL. In one embodiment, the client 102 provides an integrated development environment (IDE) for constructing SQL statements, user views, reports, and the like.

The database system 110 can also be implemented in one or more physical computing devices, such as information handling systems and/or any of the devices described above with respect to the client 102. In one embodiment, the database system 110 includes one or more servers, which may be geographically co-located or geographically dispersed (e.g., in different data centers). The database system 110 can also be implemented using one or more virtual machines. The database system 110 (and/or client 102) can also be implemented in a shared resources environment, such as a cloud computing environment or the like. For example, the database system 110 can be implemented as a machine instance or virtual machine running on a cloud computing platform, such as the Amazon Elastic Computer Cloud (EC2) provided by Amazon Web Services™.

In certain embodiments, the database system 110 includes features for mapping non-relational data stores (130a) to relational schema. Once a data store 130a has been mapped, the database system 110 can translate SQL statements received from the client 102 into a format for accessing the data store 130a. As shown, the database system 110 includes a proxy layer 112, an execution engine 114, and a storage engine 120 including several plug-ins 120a. In the depicted embodiment, the client 102 can access the database system 110 through the proxy layer 112. In certain embodiments, the proxy layer 112 pre-processes SQL statements received from the client 102. For example, the proxy layer 112 may split or divide a SQL statement that accesses multiple back-end data sources into separate SQL statements tailored for each specific source. The proxy layer 112 can also analyze the SQL in order to determine query optimizations that may improve performance. The proxy layer 112 can also perform certain dynamic, on-the-fly processing functions.

In certain embodiments, the proxy layer 112 provides pre-processed SQL statements to the execution engine 114. As shown, the execution engine 114 can include a sample optimization engine 134 and a SQL engine 136. In certain embodiments, the execution engine 114 is operable to facilitate execution of SQL statements on the data store 130*a* (via the storage engine 120) or on one more sample data sources 137. The sample data sources 137 can centralize, among other things, cached samples of one or more databases (including distributed databases) which may correspond, for example, to one or more of the data stores 130*a*. An example of the sample data sources 137 will be described in greater detail with respect to FIG. 3.

More particularly, the SQL engine 136 can be a module that generates a query execution plan for each SQL statement. The query execution plan can include information on what algorithm to use to execute the SQL statement, which indices to access, and so forth. From this execution plan, the SQL engine 136 generates a set of execution plan instructions. The SQL engine 136 can provide these execution plan instructions to the storage engine 120 via a storage engine interface.

The sample optimization engine 134 can be a module that generates a query execution plan for SQL statements that are to be executed, for example, on the sample data sources 137 instead of applicable ones of the data stores 130*a*. In certain embodiments, the sample data sources 137 can maintain centralized, cached samples that originate from the data stores 130*a*. In certain embodiments, the sample optimization engine 134 can patternize each SQL statement that is to be executed on the cached samples and attempt to match the SQL statement to pattern metadata associated with the cached samples. In various cases, if there is a pattern match between the SQL statement and one or more of the cached samples, a target sample can be selected and the SQL statement can be executed on the target sample. More detailed examples of the operation of the sample optimization engine 134 will be described with respect to FIG. 3.

The storage engine 120 can be a module that communicates with one or more back-end data stores 130*a*, such as non-relational data stores. A storage engine interface 116 of the storage engine 120 can include an API that allows the SQL engine 136 to communicate the execution plan instructions to the data stores 130*a*. The storage engine 120 also includes a storage engine client 118 that provides access to configuration data about the data stores 130*a*. Configuration data stored by the storage engine client 118 can include connectivity information regarding how to connect to a data store 130*a*. This connectivity information can include, for example, network connectivity information such as IP address, URL, port, and so forth, web service interface information (such as SOAP, XML, and/or WSDL interfaces), and the like. Further, the configuration data can reflect the data store(s) 130*a* that each plug-in 120*a* communicates with. When a plug-in 120*a* is initially added to the database system 110, the storage engine 120 can provide functionality for the plug-in 120*a* to register with the storage engine client 118 to establish this configuration data.

In one embodiment, the storage engine client 118 receives the execution plan instructions from the storage engine interface 116 and selects one or more plug-ins 120*a* to send the instructions to based on the configuration data. The plug-in 120*a* can then translate the instructions into one or more API calls, other remote procedure calls, web service calls, REST calls, or the like to one or more data stores 130*a*.

Several plug-ins 120*a* are shown in FIG. 1A. Each plug-in 120*a* can be designed to communicate with one or more different data stores 130*a*. Some example non-relational data stores 130*a* are shown, including Apache™ Hadoop, Apache™ HBase, Amazon® SimpleDB™, and Azure Table Services™. Other examples of non-relational data stores that may be included in certain implementations can include, among others, HyperTable, MongoDB, CouchDB, MemcacheDB, Megastore/GAE, Cassandra, Voldemort, Tokyo Cabinet, Dynamo, Dynamite, BigTable, Scalaris, Persevere, and Redis. The non-relational data store 130*a* can also include business intelligence data sources, file systems, flat file databases, or other data repositories.

Certain plug-ins 120*a* can also communicate with relational databases. For example, a plug-in 120*a* is shown for communicating with Oracle. An ODBC plug-in 120*a* can also be provided for communicating with other relational databases via the Open Database Connectivity (ODBC) API. By providing functionality for communicating with relational databases as well as non-relational data stores, the plug-ins 120*a* can facilitate merging, joining, exporting, or combining data from both relational and non-relational data sources. As shown, additional (or fewer) plug-ins 120*a* to other data stores 130*a* can also be provided.

In one embodiment, the database system 110 includes some or all the features of the MySQL® RDBMS. The plug-ins 120*a* can therefore be table handlers and/or storage engines that interface with the MySQL® engine. However, the database system 110 is not limited to MySQL® implementations and can be used in conjunction with other database management systems, such as PostgreSQL™ (also known as Postgres), or as a stand-alone database system independent of any currently-available commercial or non-commercial database platforms.

The example database system 110 architecture shown can also be varied considerably in other implementations. For example, the database system 110 could map one or more non-relational and/or relational data stores to one or more relational tables without employing a plug-in or storage engine architecture. The proxy layer 112 may also likewise be optional in some embodiments.

Figure 1B:
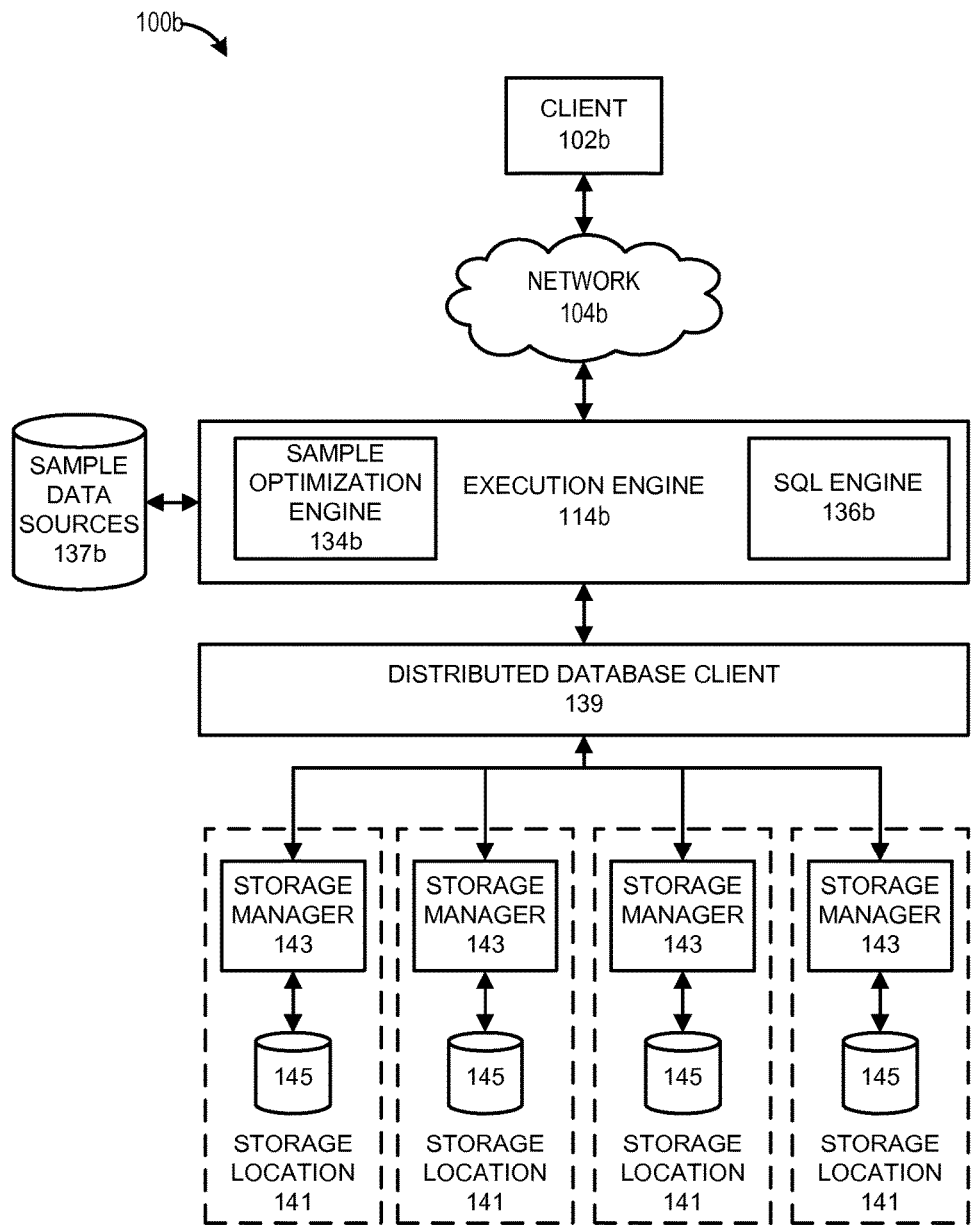
FIG. 1B illustrates an embodiment of a computing environment.

FIG. 1B illustrates an example of a computing environment 100*b*. The computing environment 100*b* includes a client 102*b*, a network 104*b*, sample data sources 137*b*, and an execution engine 114*b* that can generally operate as described with respect to the client 102, the network 104, the sample data sources 137, and the execution engine 114, respectively, of FIG. 1A. In addition, the execution engine 114*b* is shown to include a sample optimization engine 134*b* and a SQL engine 136*b* that can operate, for example, as described with respect to the sample optimization engine 134 and the SQL engine 136, respectively, of FIG. 1A.

More particularly, the computing environment 100*b* includes a distributed database client 139 that communicates with a plurality of storage locations 141 of a distributed database. Each of the storage locations 141 includes a storage manager 143 that manages a data portion 145 of the distributed database. In various cases, the data portions 145 can implement Apache™ Spark, Apache™ Hbase, etc. The distributed database client 139, via communication with the storage managers 143, can process queries to the data portions 145 and aggregate results received therefrom. The sample optimization engine 134b can be a module that generates a query execution plan for SQL statements that are to be executed, for example, on the sample data sources 137b instead of applicable ones of the storage locations 141. The sample data sources 137b can maintain centralized, cached samples that originate from various ones of the storage locations 141.

Figure 2:
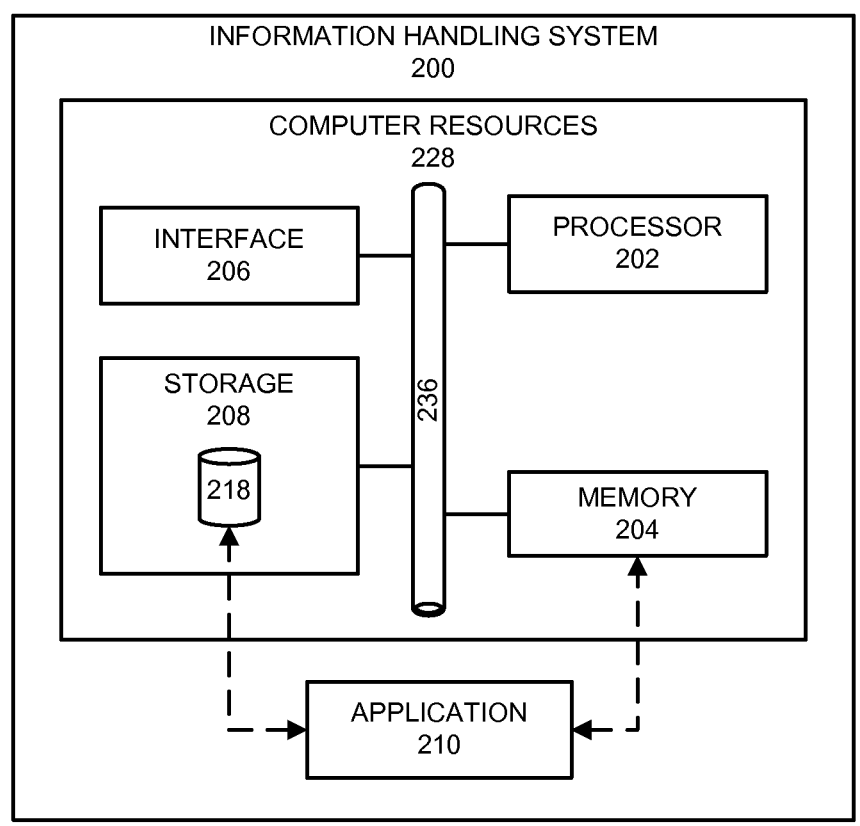
FIG. 2 illustrates an example of an information handling system.

FIG. 2 illustrates an example of an information handling system 200. In various embodiments, one or more information handling systems similar to the information handling system 200 can be included, for example, within the client 102, the database system 110, computer systems communicating with any of the foregoing, and/or the like. The information handling system 200 includes an application 210 operable to execute on computer resources 228. In particular embodiments, one or more instances of the information handling system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the information handling system 200 may comprise any suitable physical form, configuration, number, type and/or layout. As an example, and not by way of limitation, the information handling system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the information handling system 200 may include one or more computer systems; be unitary or distributed; span multiple locations; span multiple machines; or reside in a cloud, which may include one or more cloud components in one or more networks. For example, in certain embodiments, all or part of the database system 110 can reside in a cloud.

In the depicted embodiment, the information handling system 200 includes a processor 202, memory 204, storage 208, interface 206, and bus 236. Although a particular information handling system is depicted having a particular number of particular components in a particular arrangement, this disclosure contemplates any suitable information handling system having any suitable number of any suitable components in any suitable arrangement.

Processor 202 may be a microprocessor, controller, or any other suitable computing device, resource, or combination of hardware, software and/or encoded logic operable to execute, either alone or in conjunction with other components, (e.g., memory 204), the application 210. Such functionality may include providing various features discussed herein. In particular embodiments, processor 202 may include hardware for executing instructions, such as those making up the application 210. As an example and not by way of limitation, to execute instructions, processor 202 may retrieve (or fetch) instructions from an internal register, an internal cache, memory 204, or storage 208; decode and execute them; and then write one or more results to an internal register, an internal cache, memory 204, or storage 208.

In particular embodiments, processor 202 may include one or more internal caches for data, instructions, or addresses. This disclosure contemplates processor 202 including any suitable number of any suitable internal caches, where appropriate. As an example and not by way of limitation, processor 202 may include one or more instruction caches, one or more data caches, and one or more translation lookaside buffers (TLBs). Instructions in the instruction caches may be copies of instructions in memory 204 or storage 208 and the instruction caches may speed up retrieval of those instructions by processor 202. Data in the data caches may be copies of data in memory 204 or storage 208 for instructions executing at processor 202 to operate on; the results of previous instructions executed at processor 202 for access by subsequent instructions executing at processor 202, or for writing to memory 204, or storage 208; or other suitable data. The data caches may speed up read or write operations by processor 202. The TLBs may speed up virtual-address translations for processor 202. In particular embodiments, processor 202 may include one or more internal registers for data, instructions, or addresses. Depending on the embodiment, processor 202 may include any suitable number of any suitable internal registers, where appropriate. Where appropriate, processor 202 may include one or more arithmetic logic units (ALUs); be a multi-core processor; include one or more processors 202; or any other suitable processor.

Memory 204 may be any form of volatile or non-volatile memory including, without limitation, magnetic media, optical media, random access memory (RAM), read-only memory (ROM), flash memory, removable media, or any other suitable local or remote memory component or components. In particular embodiments, memory 204 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 204 may include one or more memories 204, where appropriate. Memory 204 may store any suitable data or information utilized by the information handling system 200, including software embedded in a computer readable medium, and/or encoded logic incorporated in hardware or otherwise stored (e.g., firmware). In particular embodiments, memory 204 may include main memory for storing instructions for processor 202 to execute or data for processor 202 to operate on. In particular embodiments, one or more memory management units (MMUs) may reside between processor 202 and memory 204 and facilitate accesses to memory 204 requested by processor 202.

As an example and not by way of limitation, the information handling system 200 may load instructions from storage 208 or another source (such as, for example, another computer system) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In particular embodiments, processor 202 may execute only instructions in one or more internal registers or internal caches or in memory 204 (as opposed to storage 208 or elsewhere) and may operate only on data in one or more internal registers or internal caches or in memory 204 (as opposed to storage 208 or elsewhere).

In particular embodiments, storage 208 may include mass storage for data or instructions. As an example and not by way of limitation, storage 208 may include a hard disk drive (HDD), a floppy disk drive, flash memory, an optical disc, a magneto-optical disc, magnetic tape, or a Universal Serial Bus (USB) drive or a combination of two or more of these. Storage 208 may include removable or non-removable (or fixed) media, where appropriate. Storage 208 may be internal or external to the information handling system 200, where appropriate. In particular embodiments, storage 208 may be non-volatile, solid-state memory. In particular embodiments, storage 208 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 208 may take any suitable physical form and may comprise any suitable number or type of storage. Storage 208 may include one or more storage control units facilitating communication between processor 202 and storage 208, where appropriate. In addition, in certain embodiments, the application 210 is operable to establish, or update, configurations in a data store 218 on the storage 208. The data store 218 can be a database, flat file, and/or the like. The configurations can include, for example, rules, database statements, metadata, and/or other information related to sample optimization.

In particular embodiments, interface 206 may include hardware, encoded software, or both providing one or more interfaces for communication (such as, for example, packet-based communication) among any networks, any network devices, and/or any other computer systems. As an example and not by way of limitation, communication interface 206 may include a network interface controller (NIC) or network adapter for communicating with an Ethernet or other wire-based network and/or a wireless NIC (WNIC) or wireless adapter for communicating with a wireless network.

Depending on the embodiment, interface 206 may be any type of interface suitable for any type of network for which information handling system 200 is used. As an example and not by way of limitation, information handling system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. By way of further example, the interface 206 can utilize communication via various other types of wireless communication such as infrared (IR) communication, radio frequency (RF) communication, communication via direct electrical connections, etc. In general, the information handling system 200 may include any suitable interface 206 for any one or more of these networks, where appropriate.

In some embodiments, interface 206 may include one or more interfaces for one or more I/O devices. One or more of these I/O devices may enable communication between a person and the information handling system 200. As an example and not by way of limitation, an I/O device may include a keyboard, keypad, microphone, monitor, mouse, printer, scanner, speaker, still camera, stylus, tablet, touch-screen, trackball, video camera, another suitable I/O device or a combination of two or more of these. An I/O device may include one or more sensors. Particular embodiments may include any suitable type and/or number of I/O devices and any suitable type and/or number of interfaces 206 for them. Where appropriate, interface 206 may include one or more drivers enabling processor 202 to drive one or more of these I/O devices. Interface 206 may include one or more interfaces 206, where appropriate.

Bus 236 may include any combination of hardware, software embedded in a computer readable medium, and/or encoded logic incorporated in hardware or otherwise stored (e.g., firmware) to couple components of the information handling system 200 to each other. As an example and not by way of limitation, bus 236 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 236 may include any number, type, and/or configuration of buses 236, where appropriate. In particular embodiments, one or more buses 236 (which may each include an address bus and a data bus) may couple processor 202 to memory 204. Bus 236 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 202 (such as, for example, one or more internal registers or caches), one or more portions of memory 204, one or more portions of storage 208, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in Hyper Text Markup Language (HTML), Extensible Markup Language (XML), or other suitable markup language. In particular embodiments, encoded software is expressed in a higher-level scripting language, such as Perl or JavaScript.

Figure 3:
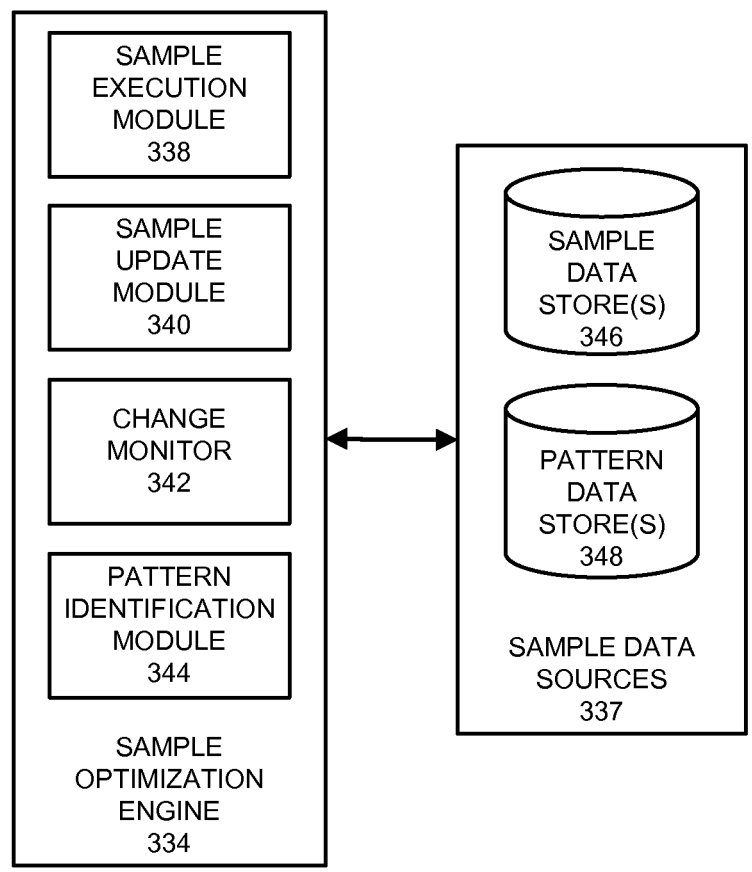
FIG. 3 illustrates an example of a sample optimization engine in relation to sample data sources.

FIG. 3 illustrates an example of a sample optimization engine 334 and sample data sources 337. In general, the sample optimization engine 334 can correspond to either the sample optimization engine 134 or 134b of FIG. 1A and FIG. 1B, respectively. In similar fashion, the sample data sources 337 can correspond to either the sample data sources 137 or 137b of FIG. 1A and FIG. 1B, respectively. In the illustrated embodiment, the sample optimization engine 334 includes a sample execution module 338, a sample update module 340, a change monitor 342, and a pattern identification module 344. The sample data sources 337 are shown to include one or more sample data stores 346 and one or more pattern data stores 348.

The sample data stores 346 can centralize cached samples of one or more databases (including distributed databases) in relation to sample metadata. In general, the sample metadata in some way describes what data is contained in each of the cached samples. In an example, the sample metadata can include pattern metadata that characterizes an assortment of data values contained in each of the cached samples. According to this example, for a particular cached sample, the pattern metadata could include any element of a database statement (e.g., a SQL statement), or a translation or normalization thereof, which is usable to retrieve the particular cached sample. Examples of pattern metadata include columns of one or more source databases, transformations (e.g., calculations or other operations), and/or the like. In that way, the pattern metadata can further indicate a resolution of each of the cached samples (e.g., filters that could be applied via inclusion of a WHERE clause).

In another example, the sample metadata can include sample-size metadata. The sample-size metadata can indicate a size of each of the cached samples relative to what a complete result set would include without sampling. For instance, a given cached sample might result from sampling a percentage (e.g., ten percent) of all records in a database. For purposes of this example, the sample-size metadata can indicate, for each of the cached samples, the percentage of sampled records, the number of sampled records, combinations of same, and/or the like.

In still another example, the sample metadata can include timing metadata. The timing metadata can be indicative of a time needed to resolve a database statement or query. In various cases, the timing metadata can include statistics such as estimated, maximum, minimum, median, and/or modal execution times. The granularity of such statistics can be configured to suit a particular implementation. In some cases, the timing metadata can correspond to a time constraint that is specified in or accompanies a database statement which resulted in a given sample (e.g., a query from a user). It should be appreciated that the foregoing examples of sample metadata are presented herein only for illustrative purposes. Other examples and variations relative to sample metadata will be apparent to one skilled in the art after reviewing the present disclosure.

The one or more pattern data stores 348 can be a repository of patterns, for example, of the form of the pattern metadata described above. In addition, the patterns of the pattern data stores 348 can include time-pattern information such as, for example, a time of day (e.g., a recurring time interval of a day such as a one-hour interval, three-hour interval, etc.), a day of the week, whether the day is a business day or non-business day, etc. In some embodiments, the one or more pattern data stores 348 can be populated by the pattern identification module 344 as described in greater detail below.

In general, the sample execution module 338 is operable to receive a database statement and facilitate execution of the statement on a target sample. The sample execution module 338 can select the target sample, for example, from among the cached samples of the sample data stores 346. In some cases, a timing constraint can be specified in or accompany the database statement (e.g., a timing constraint of two seconds). In these cases, if the sample execution module 338 determines that none of the cached samples of the sample data stores 346 is able to resolve the database statement in satisfaction of the timing constraint (e.g., by returning a resulting dataset within two seconds), the sample execution module 338 can trigger the sample update module 340 to perform a new, real-time sampling (described in greater detail below). A more detailed example of the operation of the sample execution module 338 will be described with respect to FIG. 4.

In various embodiments, the sample update module 340 can maintain and update the cached samples of the sample data stores 346. For example, in various cases, the sample update module 340 can cause new samples to be added to the sample data stores 346, refresh existing cached samples in the sample data stores 346, etc. Example operation of the sample update module 340 will be described with respect to FIG. 6.

In certain embodiments, the change monitor 342 monitors storage operations in databases from which the cached samples of the sample data stores 346 were taken. The monitored storage operations can include, for example, create, read, update and delete operations. In some embodiments, the storage operations can be monitored via database triggers on the data stores 130a. In various cases, the change monitor 342 can configurably determine, in response to each detected change, whether any of the cached samples of the sample data stores 346 should be refreshed as a result of the detected change. Example operation of the change monitor 342 will be described with respect to FIG. 5.

The pattern identification module 344 can analyze historical queries, for example, of the data stores 130a and, based thereon, predict future queries. New patterns can be fashioned from the predicted queries. In certain embodiments, the pattern identification module 344 can apply one or more machine-learning algorithms such as, for example, random forest, decision trees (e.g., C4.5), support vector machines, combinations of same, and/or the like.

The pattern identification module 344 can also predict a timing of future queries. For instance, if users routinely query for the sales averages of wine for two geographical regions over the past month, and ask for this query every month, the pattern identification module 344 can create an additional directive to prepare samples for the regions of interest in anticipation of the next query. In certain embodiments, queries are abstracted from their normal form to relative queries using date, time, location, region, and other offset information. The pattern identification module 344 can then score queries based on their similarity to one another and create an abstracted plan with triggers based on usage patterns.

Figure 4:
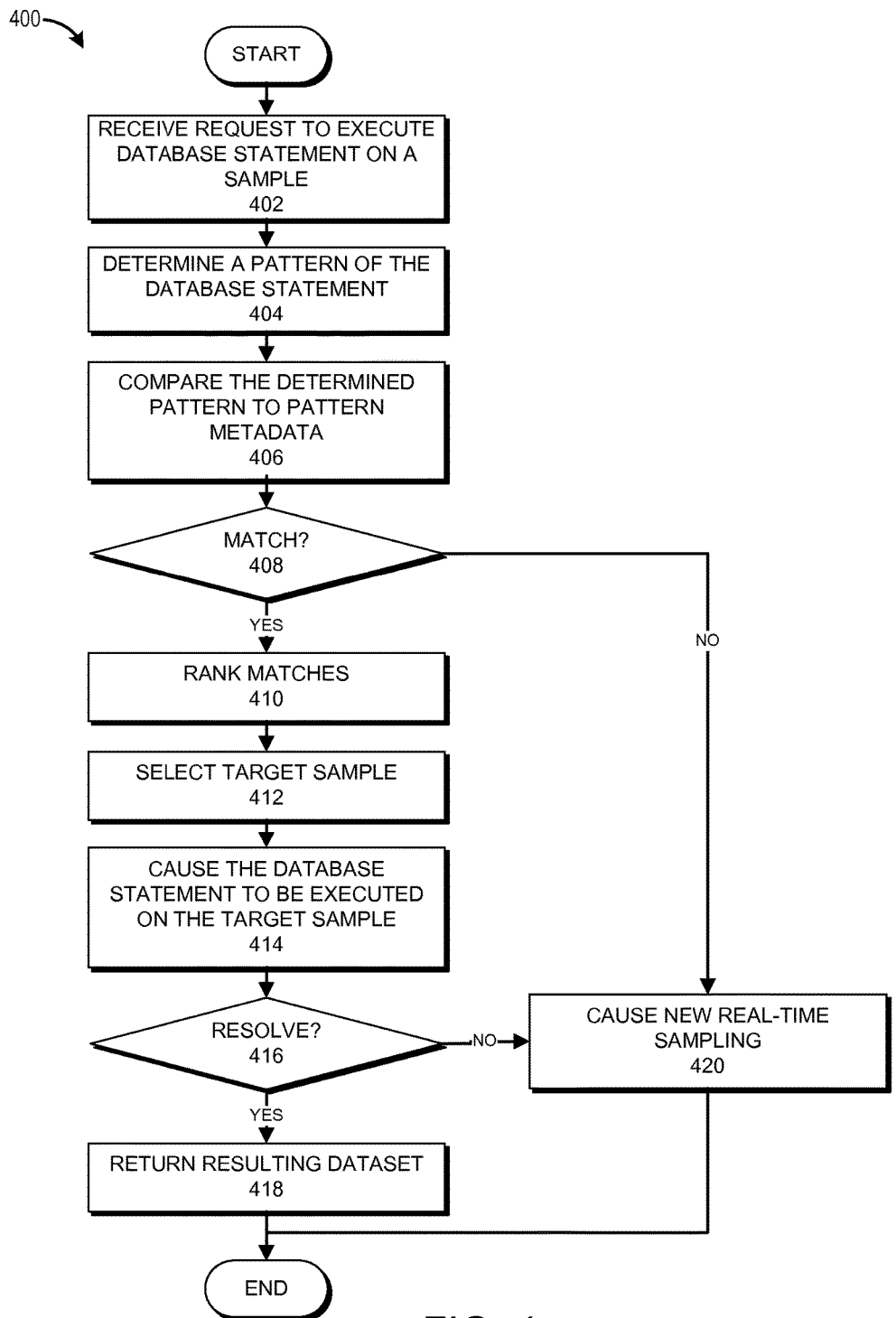
FIG. 4 illustrates an example of a process for executing database statements on cached samples.

FIG. 4 presents a flowchart of an example of a process 400 for executing database statements on cached samples. The process 400 can be implemented by any system that can access one or more data sources. For example, the process 400, in whole or in part, can be implemented by one or more of the execution engine 114, the execution engine 114*b*, the sample optimization engine 134, the sample optimization engine 134*b*, the sample optimization engine 334, the SQL engine 136, the SQL engine 136*b*, the sample execution module 338, the database system 110 (or components thereof), and/or the distributed database client 139 (or components thereof). Although any number of systems, in whole or in part, can implement the process 400, to simplify discussion, the process 400 will be described in relation to specific systems or subsystems of the computing environment 100.

At block 402, the sample execution module 338 receives a request to execute a database statement on sampled data in satisfaction of one or more criteria. For example, the criteria can include a time constraint. In various cases, the criteria can be specified in the database statement or can accompany the database statement. In an example, the criteria can include a time constraint representative of a time duration (e.g., two seconds) in which the database statement should be resolved, for example, by receiving a resulting dataset. By way of further example, the criteria can also include other attributes such as, for example, any attribute included in a format of the sample-size metadata (e.g., a percentage of records sampled). In some embodiments, the database statement can be received via the proxy layer 112 as described with respect to FIG. 1A.

At block 404, the sample execution module 338 determines a pattern of the database statement based, at least in part, on an analysis of database statement syntax. In certain embodiments, the block 404 can include breaking the database statement into parts that include, for example, one or more columns, one or more transformations such as calculations, and data-resolution limitations.

For instance, an example database statement might implement a query to count cars in cities of more than 100,000 people. The example database statement could select, for example, columns of CITY, TOTAL_CARS and CITY_POPULATION from a CITY database (e.g., on one or more of the data stores 130*a*). According to this example, the sample execution module 338 can determine, or generate, a pattern that identifies the columns of the example database statement, data transformations of the example database statement (e.g., a counting operation), and data-resolution limitations (e.g., a limitation of p>100,000 on the CITY_SIZE column, where p represents city size), potentially among other attributes. The determined pattern can be a normalized format that conforms to a format of the pattern metadata maintained in the sample data stores 346.

At block 406, the sample execution module 338 compares the determined pattern to the pattern metadata of the sample data stores 346. In general, the block 406 can include comparing each attribute of the determined pattern to a corresponding attribute of each of the cached samples (or a subset thereof) of the sample data stores 346. As part of the block 406, the sample execution module 338 can search for cached samples that satisfy the data-resolution limitation. In certain embodiments, this can include seeking out cached samples that provide a greater resolution than what is required. In the case of the above example with the data-resolution limitation of cities having more than 100,000 people, the sample execution module 338 could also seek out cached samples that are over-inclusive relative to the request, for example, by having data resolutions of greater than 50,000 people, a data resolution that includes all city sizes, etc.

In some embodiments, the block 406 can include analyzing an ability of the cached samples to individually satisfy the database statements. In addition, in some cases, the block 406 can include analyzing an ability of combinations of the cached samples to satisfy the database statement. In these embodiments, the sample execution module 338 can assess whether any combinations of smaller, under-inclusive samples might, together, have a sufficient data resolution to satisfy the database statement. For example, continuing the above example of counting cars in cities of more than 100,000 people, the sample execution module 338 may be able to identify, using the data-resolution limitations of the pattern metadata, a first cached sample that contains requested data for cities of 0 to 250,000 people and a second cached sample that contains requested data for cities of greater than 250,000 people. According to this example, the first cached sample and the second cached sample together provide sufficient data resolution to satisfy the data-resolution limitation of the example database statement.

At decision block 408, the sample execution module 338 determines whether there are any cached samples (or combinations thereof) that, based on the pattern metadata, match the determined pattern. What constitutes a match can be configurable. In some embodiments, a match may require sufficient data to satisfy the database statement. In these embodiments, it may be sufficient to have, for example, exact matches of columns between the determined pattern and the pattern metadata, so long as the data resolution is sufficient and any data transformations can be performed. In other cases, additional constraints can be imposed on matches. For instance, the data-resolution limitation and/or the data transformations of the determined pattern may be required to exactly correspond to the pattern metadata and/or the data transformations, respectively, of a given cached sample. Other variations and examples will be apparent to one skilled in the art after reviewing the present disclosure. If it is determined at the decision block 408 that there are no matches, the process 400 proceeds to block 420. Otherwise, if it is determined at the decision block 408 that there is at least one match, the process 400 proceeds to block 410.

At block 410, the sample execution module 338 ranks the matching cached samples (including matched combinations). The block 410 can be skipped if, for example, there is only one match. The matches can be ranked based on any suitable criteria. In some embodiments, the ranking can be based on a degree to which the data-resolution limitation of the determined pattern matches the data-resolution limitation of each of the matching cached samples. In one embodiment, matches having a lesser degree of over-inclusion relative to the data-resolution limitation of the determined pattern can be ranked higher (or weighted more) than those having a higher degree of over-inclusion. The ranking can also include ranking higher (or weighting more) based on an extent to which the data transformations of the pattern metadata include the data transformations of the determined pattern, recency of a last refresh, sample-size information (favoring larger or smaller samples, in various cases), how many or which data transformations need to be performed (as opposed to being included in the sample), etc. In general, the ranking can be based on any combination of the foregoing and/or other data.

At block 412, the sample execution module 338 selects a target sample from among the matching cached samples. The target sample can be, for example, a highest ranked sample. It should be appreciated that, in some cases, the target sample can be a combination of cached samples of the sample data stores 346. At block 414, the sample execution module 338 causes the database statement to be executed on the target sample.

At decision block 416, the sample execution module 338 determines whether the target sample can resolve the database statement in satisfaction of the time constraint. In certain embodiments, the time constraint is determined to be satisfied if a resulting dataset is received before a time duration specified in the time constraint expires. If it is determined at the decision block 416 that the target sample can resolve the database statement in satisfaction of the time constraint, at block 418, the sample execution module 338 returns the resulting dataset to a requestor via, for example, the client 102. After block 418, the process 400 ends.

If it is determined at the decision block 416 that the target sample cannot resolve the database statement in satisfaction of the time constraint, the process 400 proceeds to block 420. At block 420, the sample execution module 338 causes a new real-time sampling of the database to be executed according to the determined pattern of the database statement. An example of how the real-time sampling can occur will be described in relation to FIG. 6. After block 420, the process 400 ends.

Figure 5:
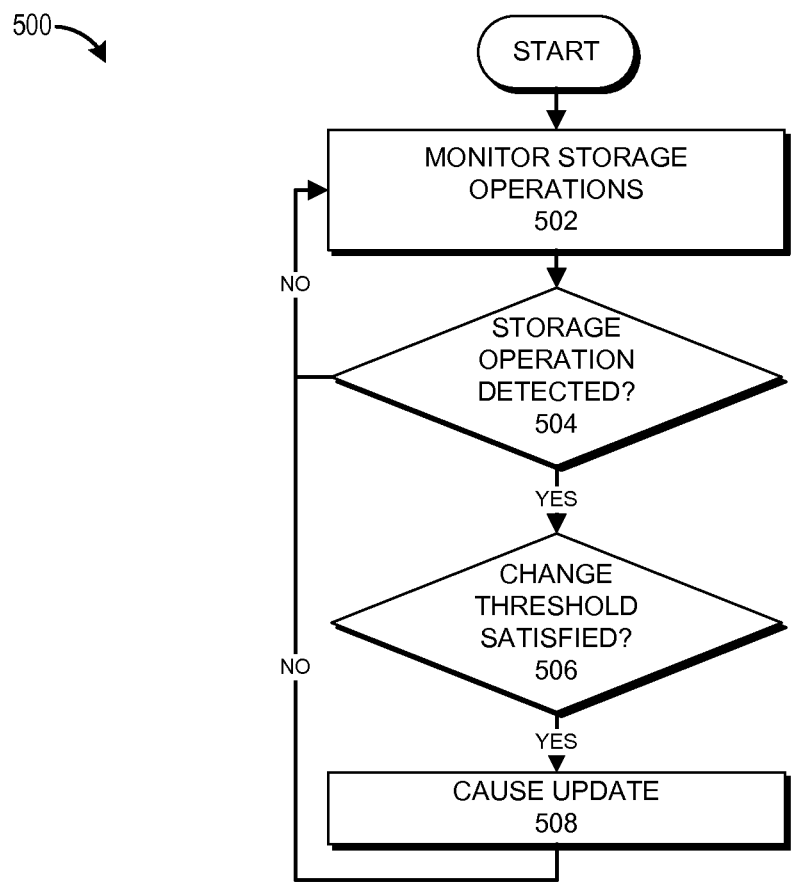
FIG. 5 illustrates an example of a process for monitoring change in one or more databases.

FIG. 5 presents a flowchart of an example of a process 500 for monitoring change in one or more databases. The process 500 can be implemented by any system that can access one or more data sources. For example, the process 500, in whole or in part, can be implemented by one or more of the execution engine 114, the execution engine 114b, the sample optimization engine 134, the sample optimization engine 134b, the sample optimization engine 334, the SQL engine 136, the SQL engine 136b, the change monitor 342, the database system 110 (or components thereof), and/or the distributed database client 139 (or components thereof). Although any number of systems, in whole or in part, can implement the process 500, to simplify discussion, the process 500 will be described in relation to specific systems or subsystems of the computing environment 100.

At block 502, the change monitor 342 monitors for storage operations in relation to a set of databases on the data stores 130a. In various embodiments, the set of databases can correspond to the set of databases from which the cached samples of the sample data stores 346 were generated. In certain embodiments, storage operations can be monitored using database triggers configured to notify the change monitor 342 upon certain events such as, for example, a create, read, update, or delete operation.

At decision block 504, the change monitor 342 determines whether a storage operation has been detected. If it is determined that a storage operation has not been detected, the change monitor 342 returns to block 502 and proceeds as described above. Otherwise, if it is determined at the decision block 504 that a storage operation has been detected, the process 500 proceeds to decision block 506.

At decision block 506, the change monitor 342 determines whether the detected storage operation causes any of the cached samples of the sample data stores 346 to reach a change threshold. In certain embodiments, the change threshold can be expressed in terms of a metric of interest such as, for example, a calculated mean. In an example, the change threshold could require could require that, if more than one standard deviation of change occurs in the metric of interest, then a refresh of a corresponding cached sample should occur. In another example, the change threshold could require that, if more than a specified percentage of records in a particular database have changed since a particular cached sample of the particular database was generated, then a refresh of the particular cached sample should occur. Other variations and examples will be apparent to one skilled in the art after reviewing the present disclosure. In general, the change threshold can include any combination of the foregoing criteria and/or other criteria. In some cases, although the detected storage operation by itself would not cause the change threshold to be reached, the cumulative effect of previous storage operations (together with the detected storage operation) may cause the change threshold to be satisfied.

If it is determined at the decision block 506 that the detected storage operation does not cause any of the cached samples of the sample data stores 346 to reach a change threshold, the process 500 returns to block 502 and proceeds as described above. Otherwise, if it is determined at the decision block 506 that the detected storage operation causes at least one of the cached samples of the sample data stores 346 to reach a change threshold, the process 500 proceeds to block 508.

At block 508, the change monitor 342 causes the sample update module 340 to update, or refresh, each cached sample for which a change threshold was satisfied along with corresponding sample metadata. Example operation of the sample update module 340 will be described in greater detail with respect to FIG. 6. From block 508, the process 500 returns to block 502 and proceeds as described above. In various embodiments, the process 500 can continue until terminated by a user or administrator or when other suitable stop criteria is met.

Figure 6:
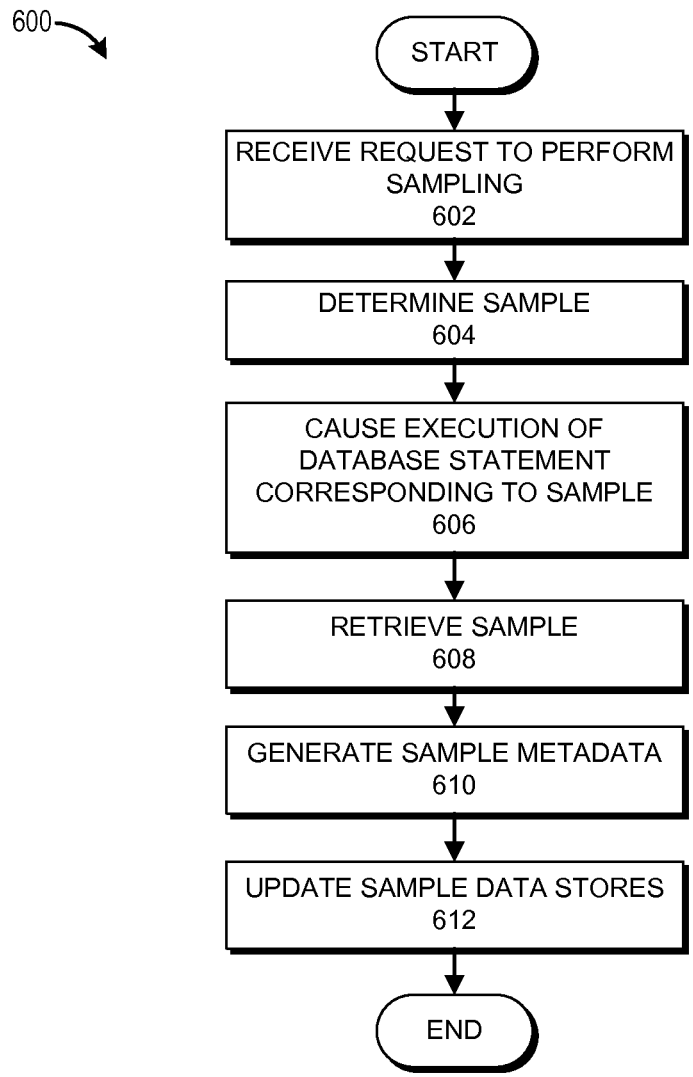
FIG. 6 illustrates an example of a process for updating sample data stores.

FIG. 6 presents a flowchart of an example of a process 600 for updating sample data stores such as the sample data stores 346 of FIG. 3. The process 600 can be implemented by any system that can access one or more data sources. For example, the process 600, in whole or in part, can be implemented by one or more of the execution engine 114, the execution engine 114b, the sample optimization engine 134, the sample optimization engine 134b, the sample optimization engine 334, the SQL engine 136, the SQL engine 136b, the sample update module 340, the database system 110 (or components thereof), and/or the distributed database client 139 (or components thereof).

At block 602, the sample update module 340 receives a request to perform a sampling of one or more databases of the data stores 130a. In an example, the request can be received from the sample execution module 338. In general, the request can include a database statement, a determined pattern of the database statement, a requested sample size (e.g., percentage of records on which to base the sample), a timing constraint, and/or other information.

As described above with respect to the block 420 of FIG. 4, the sample execution module 338 may sometimes decide to cause a new real-time sampling, for example, because of a determination that no existing cached sample is suitable to resolve a requested database statement (e.g., due to lacking necessary data resolution or an inability to satisfy a time constraint). According to this example, the information included in the request can specifically relate to the unresolvable database statement (e.g., the requested database statement, a determined pattern of the unresolvable database statement, a sample size associated with the requested database statement, a timing constraint associated with the requested database statement, etc.).

In another example, the request can be received from the change monitor 342. As described above relative to the block 508 of FIG. 5, the change monitor 342 can determine that an out-of-date cached sample and corresponding pattern metadata (stored in the sample data stores 346) should be updated, or refreshed (e.g., as a result of a change threshold being satisfied). According to this example, the information included in the request can specifically relate to the out-of-date cached sample (e.g., a database statement that resulted in the cached sample, a pattern of the cached sample, a requested sample size, a timing constraint, and/or other information).

In yet another example, the request can be received from the pattern identification module 344. In certain embodiments, after a new pattern is identified, the pattern identification module 344 can cause a new sample to be executed based on the new pattern. According to this example, the information included in the request can specifically relate to the new pattern (e.g., the pattern itself, a corresponding sample size, a timing constraint, etc.). As another example, in some cases, the sample update module 340 can be triggered as a scheduled task. In these cases, the sample update module 340 may perform an update of some or all of the cached samples of the sample data stores 346 as part of the scheduled task.

At block 604, the sample update module 340 determines a sample. In certain embodiments, the sample can be determined using information contained in the request received at the block 602. In general, the block 604 can include determining information sufficient to fashion a database statement operable to retrieve the determined sample. At block 606, the sample update module 340 causes the database statement to be executed on one or more corresponding databases on the data stores 130*a*. In some embodiments, the sampling can be performed via the SQL engine 136. At block 608, the sample update module 340 retrieves a sample which corresponds to the sample determined at the block 604.

At block 610, the sample update module 340 generates sample metadata for the retrieved sample. In general, the block 610 can result in pattern metadata, sample-size metadata, timing metadata, and/or other metadata. The pattern metadata can be determined in similar fashion to a pattern as described with respect to the block 404 of FIG. 4. In many cases, the sample-size metadata and the timing metadata can include the requested sample size and the timing constraint, respectively, which were specified in the request to perform the sampling.

At block 612, the sample update module 340 updates the sample data stores 346 to include the retrieved sample and the generated sample metadata. If the process 600 was triggered due to an out-of-date sample, the update can include refreshing the out-of-date sample and corresponding sample metadata based on the retrieved sample and the metadata from the block 610. If the retrieved sample is a new sample, the block 612 can including adding the new sample to the cached samples of the sample data stores 346 and, additionally, storing the sample metadata with the sample metadata of the samples data stores 346.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a computer system:
receiving a request to execute a database statement in satisfaction of a time constraint, wherein the database statement specifies a distributed database as a data source;
determining a pattern of the database statement based, at least in part, on an analysis of syntax in the database statement;
comparing the pattern to stored pattern metadata associated with cached samples of the distributed database;
wherein, for each cached sample of the cached samples, the stored pattern metadata characterizes an assortment of data values stored in the cached sample;
responsive to a determination that the comparing has resulted in one or more matches between the pattern and the stored pattern metadata, selecting a target sample from among the cached samples;
causing the database statement to be executed on the target sample;
responsive to a determination that the target sample resolves the database statement in satisfaction of the time constraint, returning a resulting dataset to a requestor; and responsive to a determination that the target sample does not resolve the database statement satisfaction in of the time constraint, causing a new real-time sampling of the distributed database to be executed.

2. The method of claim 1, wherein the causing of the new real-time sampling comprises:
   determining a new sample of the distributed database based, at least in part, on the database statement;
   retrieving the new sample;
   adding the new sample to the cached samples; and
   storing metadata related to the new sample in the stored pattern metadata.

3. The method of claim 1, comprising:
   monitoring storage operations in relation to the distributed database;
   responsive to a determination that a storage operation on the distributed database causes at least one cached sample of the cached samples to reach a change threshold:
      updating the at least one cached sample; and
      refreshing a portion of the stored pattern metadata related to the at least one cached sample.

4. The method of claim 1, wherein the stored pattern metadata indicates a size of each of the cached samples relative to a size of a complete result set.

5. The method of claim 1, wherein the pattern comprises information related to columns and operations of the database statement.

6. The method of claim 1, wherein the comparing comprises:
   analyzing an ability of each of the cached samples to satisfy the database statement; and
   analyzing an ability of combinations of the cached samples to satisfy the database statement.

7. The method of claim 1, wherein the target sample comprises a combination of two or more of the cached samples.

8. The method of claim 1, comprising:
   responsive to two or more matches being determined, ranking the two or more matches; and
   wherein the selecting is based, at least in part, on the ranking.

9. An information handling system comprising at least one processor, wherein the at least one processor is operable to implement a method comprising:
   receiving a request to execute a database statement in satisfaction of a time constraint, wherein the database statement specifies a distributed database as a data source;
   determining a pattern of the database statement based, at least in part, on an analysis of syntax in the database statement;
   comparing the pattern to stored pattern metadata associated with cached samples of the distributed database;
   wherein, for each cached sample of the cached samples, the stored pattern metadata characterizes an assortment of data values stored in the cached sample;
   responsive to a determination that the comparing has resulted in one or more matches between the pattern and the stored pattern metadata, selecting a target sample from among the cached samples;
   causing the database statement to be executed on the target sample;
   responsive to a determination that the target sample resolves the database statement in satisfaction of the time constraint, returning a resulting dataset to a requestor; and
   responsive to a determination that the target sample does not resolve the database statement satisfaction in of the time constraint, causing a new real-time sampling of the distributed database to be executed.

10. The information handling system of claim 9, wherein the causing of the new real-time sampling comprises:
    determining a new sample of the distributed database based, at least in part, on the database statement;
    retrieving the new sample;
    adding the new sample to the cached samples; and
    storing metadata related to the new sample in the stored pattern metadata.

11. The information handling system of claim 9, the method comprising:
    monitoring storage operations in relation to the distributed database;
    responsive to a determination that a storage operation on the distributed database causes at least one cached sample of the cached samples to reach a change threshold:
       updating the at least one cached sample; and
       refreshing a portion of the stored pattern metadata related to the at least one cached sample.

12. The information handling system of claim 9, wherein the stored pattern metadata indicates a size of each of the cached samples relative to a size of a complete result set.

13. The information handling system of claim 9, wherein the pattern comprises information related to columns and operations of the database statement.

14. The information handling system of claim 9, wherein the comparing comprises:
    analyzing an ability of each of the cached samples to satisfy the database statement; and
    analyzing an ability of combinations of the cached samples to satisfy the database statement.

15. The information handling system of claim 9, wherein the target sample comprises a combination of two or more of the cached samples.

16. The information handling system of claim 9, the method comprising:
    responsive to two or more matches being determined, ranking the two or more matches; and
    wherein the selecting is based, at least in part, on the ranking.

17. A computer-program product comprising a non-transitory computer-usable medium having computer-readable program code embodied therein, the computer-readable program code adapted to be executed to implement a method comprising:
    receiving a request to execute a database statement in satisfaction of a time constraint, wherein the database statement specifies a distributed database as a data source;
    determining a pattern of the database statement based, at least in part, on an analysis of syntax in the database statement;
    comparing the pattern to stored pattern metadata associated with cached samples of the distributed database;
    wherein, for each cached sample of the cached samples, the stored pattern metadata characterizes an assortment of data values stored in the cached sample;
    responsive to a determination that the comparing has resulted in one or more matches between the pattern and the stored pattern metadata, selecting a target sample from among the cached samples;
    causing the database statement to be executed on the target sample;

responsive to a determination that the target sample resolves the database statement in satisfaction of the time constraint, returning a resulting dataset to a requestor; and responsive to a determination that the target sample does not resolve the database statement satisfaction in of the time constraint, causing a new real-time sampling of the distributed database to be executed.

18. The computer-program product of claim 17, wherein the causing of the new real-time sampling comprises:
   determining a new sample of the distributed database based, at least in part, on the database statement;
   retrieving the new sample;
   adding the new sample to the cached samples; and
   storing metadata related to the new sample in the stored pattern metadata.

19. The computer-program product of claim 17, the method comprising:
   monitoring storage operations in relation to the distributed database;
   responsive to a determination that a storage operation on the distributed database causes at least one cached sample of the cached samples to reach a change threshold:
      updating the at least one cached sample; and
      refreshing a portion of the stored pattern metadata related to the at least one cached sample.

20. The computer-program product of claim 17, wherein the stored pattern metadata indicates a size of each of the cached samples relative to a size of a complete result set.

* * * * *